June 1, 1926.
W. P. THORNTON
1,586,539
PROCESS FOR REFINING OR TREATING SULPHUR
Filed July 21, 1923 4 Sheets-Sheet 1
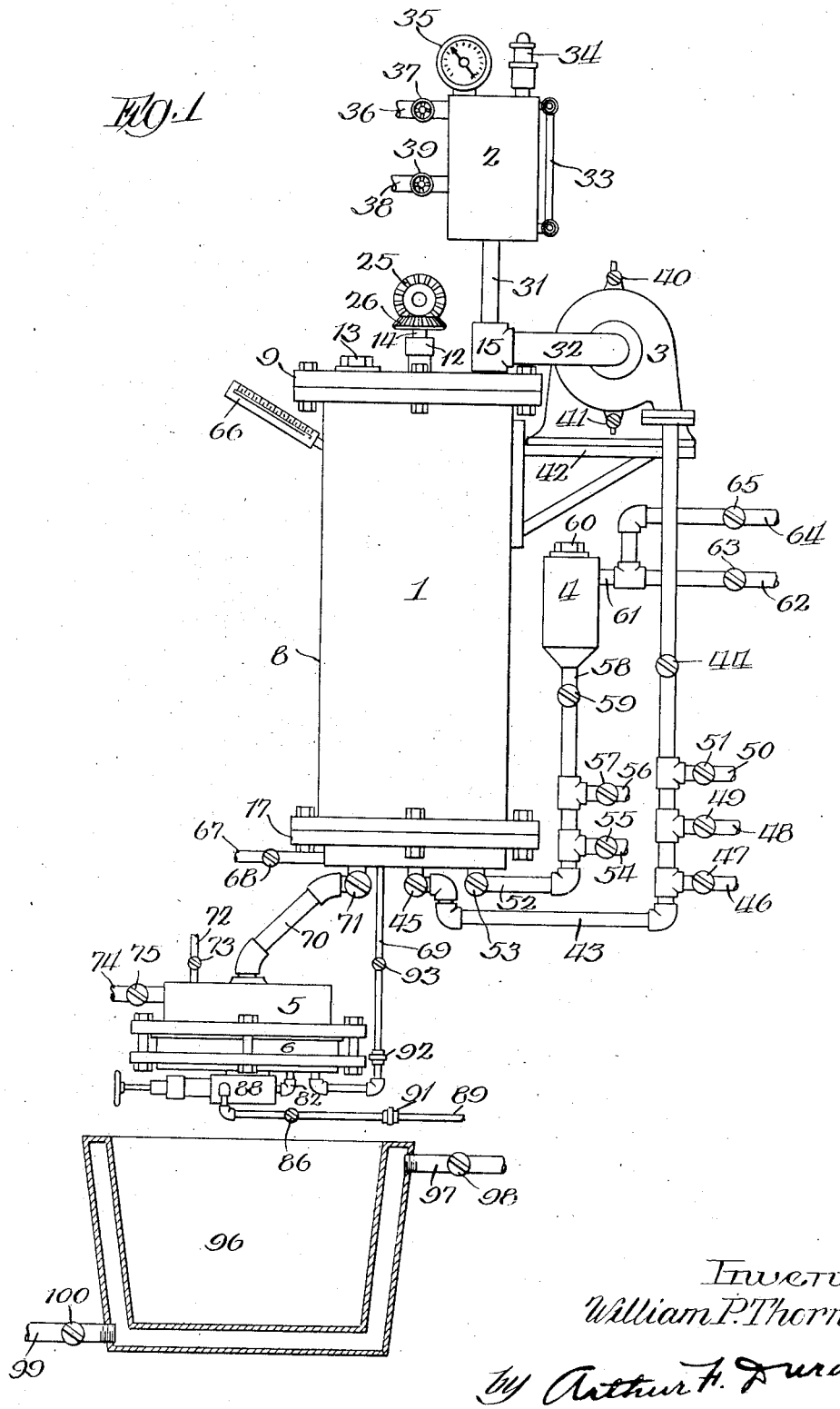
Inventor:
William P. Thornton
by Arthur H. Durand
Atty.

June 1, 1926.
W. P. THORNTON
1,586,539
PROCESS FOR REFINING OR TREATING SULPHUR
Filed July 21, 1923    4 Sheets-Sheet 2
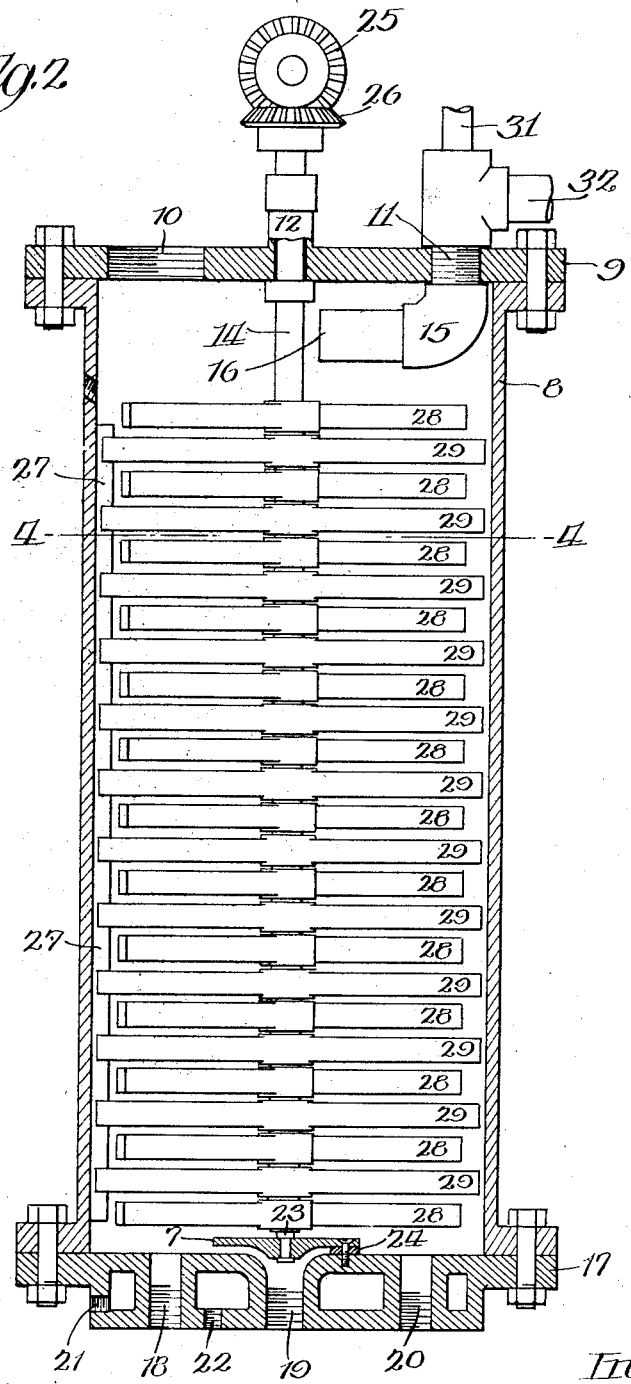

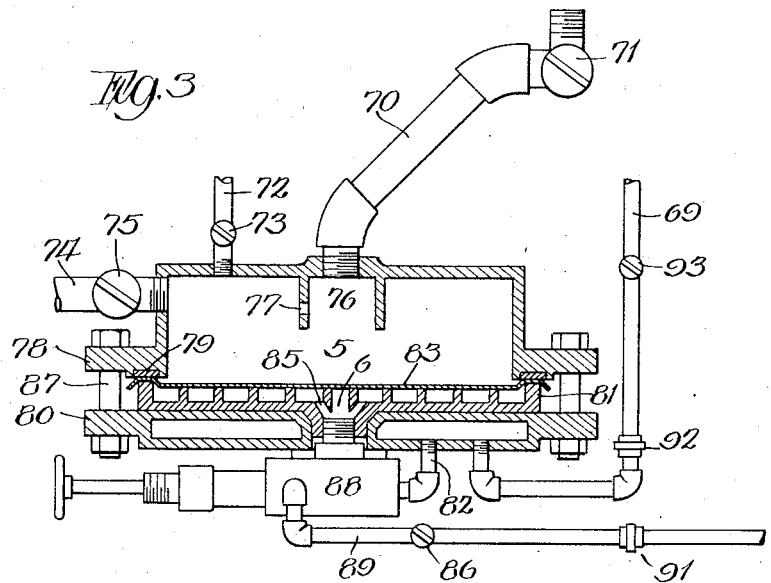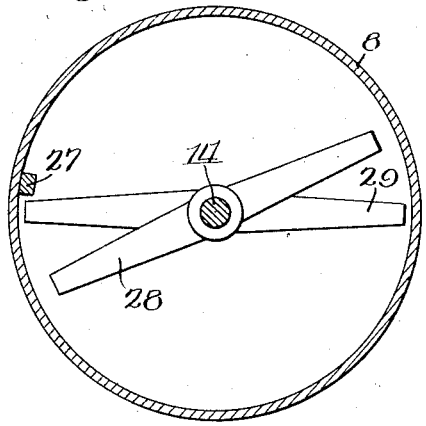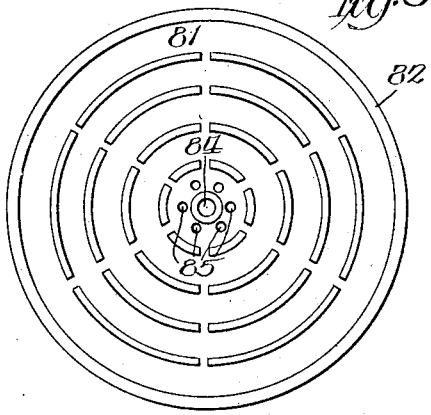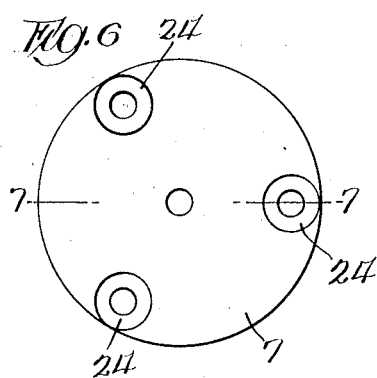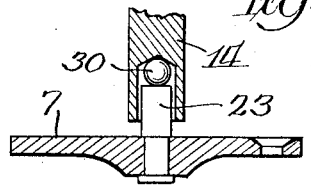

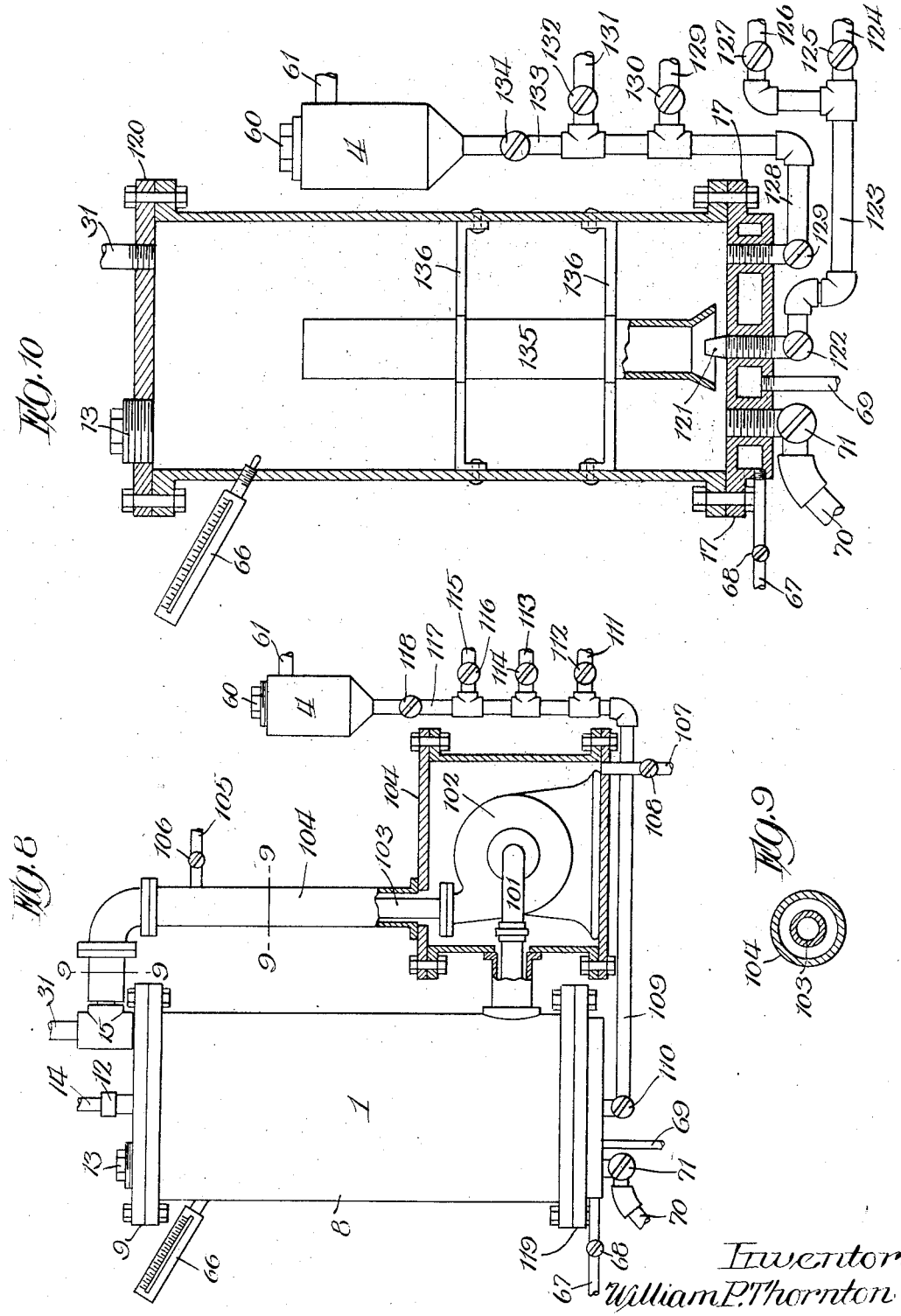

Patented June 1, 1926.

1,586,539

UNITED STATES PATENT OFFICE.

WILLIAM P. THORNTON, OF PARK RIDGE, ILLINOIS.

PROCESS FOR REFINING OR TREATING SULPHUR.

Application filed July 21, 1923. Serial No. 652,934.

This invention relates to processes and apparatus for refining brimstone and for recovering sulphur from its concentrates and from its richer ores.

Generally stated the object of the invention is to remove from brimstone and concentrates of sulphur and the richer sulphur ores, the earthy matter, ash, acid and moisture therein and the other matter therein not soluble in carbon disulphide, and to provide a suitable apparatus therefor.

It is also an object to provide certain details of construction and features tending to increase the general efficiency and the desirability of a process and apparatus of this particular character.

To these and other useful ends the invention consists in matters hereinafter set forth and claimed and shown in the accompanying drawings in which—

Fig. 1 is an elevation of an apparatus embodying the principles of the invention, consisting of a mixer 1, an overflow tank 2, a circulating pump 3, a chamber for introducing chemicals 4, a strainer chamber 5, a strainer 6, and steam jacketed vessel 96, together with the necessary connections, piping, valves and fittings.

Fig. 2 is an enlarged vertical section of the mixer 1.

Fig. 3 is an enlarged vertical section of the strainer chamber 5 and the strainer 6.

Fig. 4 is a section on line 4—4 in Fig. 2.

Fig. 5 is a plan of the strainer plate which supports the straining medium.

Fig. 6 is an enlarged view of the underside of the supporting and distributing plate 7 in Fig. 2.

Fig. 7 is a section on the line 7—7 in Fig. 6.

Fig. 8 is a form of mixer embodying the principles of the invention, adapted for use when the melted sulphur instead of the hot water is circulated.

Fig. 9 is a section on either of the lines 9—9 in Fig. 8.

Fig. 10 is a form of mixer embodying the principles of the invention, in which the frothing of the liquid sulphur is relied on to circulate the sulphur. It has no pump and no agitators.

As thus illustrated the apparatus employed in practicing the invention comprises an upright cylindrical receptacle 8 (Fig. 2) closed at its upper end by a plate 9 which is provided with two openings 10 and 11, and also at its center with a stuffing box 12, and through the opening 10 brimstone or sulphur concentrates or ore may be charged into the mixer. Said opening 10 is closed at will by the plug 13, and through the stuffing box 12 passes the shaft 14, while through the opening 11 passes an outlet pipe 15 the inlet 16 of which is within the receptacle 8 and as near the center of said receptacle as is convenient. The inlet 16 is near the center for the reason that when the apparatus is in use the mixer 1 has in it melted sulphur and hot water in a state of agitation and these liquids are whirling in the same direction as the agitators are turned. The melted sulphur is heavier than the water. Toward the top of the mixer the centrifugal force tends to keep the melted sulphur away from the center of the mass and thus the inlet pipe 16 (being placed toward the center of the mass) is less liable to take up melted sulphur. The lower end of the receptacle 8 is closed by a hollow steam-heated plate 17 which is provided with three openings 18, 19 and 20 extending perpendicularly through it and connecting with the inside of said mixer, and it is also provided with two openings 21 and 22 in the outer wall of said steam-heated plate and connecting with the steam space within said plate. The shaft 14 extends perpendicularly through the center of said mixer, and its lower end rests on a ball 30 (Fig. 7) on the upper end of the pin 23 supported by the distributing plate 7 which is placed over the central opening 19 and a short distance above the upper surface of the steam-heated plate 17 and rests on three or more legs 24 (Fig. 6) which are held rigidly in place (by any suitable means) by screws inserted through said legs into said plate 17. To the upper end of the shaft 14 and above the stuffing box 12 are attached means of rotating said shaft, such as cog wheels 25 and 26, and on the inside of the cylinder 8, extending perpendicularly and fastened to the wall of the cylinder, is a strip 27. To the shaft 14 are attached agitators 28 which rotate with the shaft and are of such length that the ends will pass by the strip 27 without striking it. The shaft 14 also supports and passes loosely through stops 29 which are of substantially the same shape as the agitators except that they are so long that in revolving one end of each stop will strike the strip 27. When the shaft 14 is rotated the agitators 28 turn with it and pass between the stops 29. The agitators 28 may be staggered in placing them on the shaft 14.

The outlet pipe 15 (Fig. 2) after it passes through the plate 9 divides into two branches 31 and 32, and the pipe 31 (Fig. 1) extends upwardly to the overflow tank 2, which latter is provided with a water glass 33, safety valve 34, steam gauge 35 and outlet pipe 36 controlled by a valve 37 and an outlet pipe 38 controlled by the valve 39. The outlet pipe 36 is adapted to remove any excess of steam pressure and the outlet pipe 38 is adapted to remove any excess of water.

The pipe 32 extends to and is connected with the inlet of the circulating pump 3, which pump is provided with two pet cocks 40 at the top of the pump and 41 at the bottom of the pump. The circulating pump 3 is attached to and supported by the mixer 1. From the outlet of the circulating pump a pipe 43 controlled by the valves 44 and 45 extends to the opening 19 in the plate 17, so that when the apparatus is charged with water and the valves 44 and 45 are open the circulating pump can pump the water from the outlet pipe 15 through the pipe 43 and the opening 19 into the bottom of the mixer.

The valve 45 is placed so as to close the pipe 43 as near the bottom plate of the mixer 1 as possible and the valve 44 is placed between the valve 45 and the circulating pump 3. Between these two valves the pipe 43 has three branch pipes, the pipe 46 controlled by the pipe 47 and connected with a source of steam under pressure, the pipe 48 controlled by the valve 49 and connected with a source of hot water under pressure, and the pipe 50 controlled by the valve 51 and connected with a source of cold water.

From the opening 20 in the plate 17 extends a pipe 52 controlled by a valve 53, and the pipe 52 has three branches, first, the pipe 54 controlled by the valve 55 connected with a source of steam under pressure, second, the pipe 56 controlled by the valve 57 connected with a source of hot water, under pressure, and third, the pipe 58 controlled by the valve 59.

The pipe 58 connects with the lower end of the chamber 4 which at its upper end is provided with a plug 60, and when the plug is removed, liquids or solids can be placed in the chamber 4. The chamber 4 is also provided with an inlet pipe 61 which has two branches, first, the pipe 62 controlled by the valve 63 and connected with a supply of steam under pressure, and second, the pipe 64 controlled by the valve 65 and connected with a source of hot water under pressure. The use of the chamber 4 is as follows:

By removing the plug 60, chemicals, either liquid or ground, may be placed in the chamber 4 and the plug 60 can then be screwed in place. Then by opening the valve 59 and either the valve 63 or the valve 65, steam or hot water can be used to wash the contents of the chamber 4 into the pipes 58 and 52 and from thence into the mixer through the valve 53.

A thermometer 66 is attached to the mixer, the bulb extending inside the mixer so as to ascertain the temperature of the mixer.

A steam pipe 67 controlled by the valve 68 and connected with a supply of steam under pressure is inserted in the opening 21 of the steam-heated plate 17 and connects with the steam space within said plate and heats said plate 17, and a pipe 69 connects the steam space within said plate 17 with the steam space in the lower plate of the strainer, as hereinafter mentioned.

From the opening 18 in the plate 17 there extends a pipe 70, preferably at an angle during the greater part of its course, by which the melted sulphur is drawn out of the mixer. The downward flow of the sulphur (as near the plate 17 as is convenient) is controlled by a valve 71. Steam under pressure is admitted to this strainer chamber through the pipe 72 controlled by the valve 73 and water may be drawn from the strainer chamber by the pipe 74 controlled by the valve 75. Centrally located in the strainer chamber 5 is a smaller chamber 76 (Fig. 6) extending downwardly approximately one-half the height of the strainer chamber 5. The pipe 70 empties into the upper end of this smaller chamber. The lower end of this smaller chamber 76 is open and through its perpendicular wall about one-half way down and preferably in that part of said perpendicular wall nearest the center line extended of the pipe 70, is a hole 77. At the lower end of the strainer chamber is a flange 78 and in this flange is seated a gasket 79 against which the strainer plate hereinafter mentioned is clamped to make a tight joint.

The strainer is constructed as follows: There is a hollow steam-heated horizontal lower plate 80 with three openings, namely, an opening extending perpendicularly through said plate at its center to accommodate the extension and central passage of the strainer plate 81 hereinafter mentioned, and also an opening extending through its lower outer wall through which the pipe 69 delivers steam to the steam space within said plate and another opening through the lower outer wall of said strainer plate through which steam and water of condensation may pass out through the pipe 82. On this steam-heated lower plate rests the grooved strainer plate 81. Said grooved strainer plate has curved raised ridges, as shown in Fig. 5, the outer ridge 82 being somewhat higher than the other ridges and adapted to press the edges of the filtering medium 83 against the gasket 79 and form a steam-tight joint. The ridges on the grooved plate 81 have recesses between them and they are connected together with spaces formed in all of said ridges except the center and outside ridges. The center of the plate has a centrally located discharge opening 84 and openings 85 leading to said central discharge opening from the adjacent cavity formed between the curved ridges. The straining medium 83 is preferably light duck or some other fabric, and lies on and is supported by the curved ridges of the plate 81, and liquid passing through said straining medium is carried off by the grooves and spaces in the grooves to the holes 85 and the central passage opening 84. The flange 78 of the strainer chamber and the lower plate 80 are bolted together by bolts 87, clamping the outer ridge of the strainer plate against the straining medium and the gasket 79.

Screwed into or otherwise attached to the discharge opening 84 of the straining plate is a heated draw-off valve 88, preferably a steam-heated draw-off valve, and the steam and water of condensation passing out of the plate 80 by the pipe 82 may be used to heat this valve and the outward flow of the water of condensation may be controlled by the valve 86, in a manner that will readily be understood.

Under the draw-off valve 88 and in a position to receive the melted sulphur as it is discharged from said draw-off valve is a heated receptacle 96, preferably heated by a steam jacket into which steam is admitted by the pipe 97, controlled by the valve 98, and out of which the water of condensation flows through the pipe 99, controlled by the valve 100, or by any suitable means.

As heretofore stated the pipe 50, controlled by the valve 51, is connected with a source of cold water under pressure. This cold water is used at times to clean the apparatus and when the apparatus is left without being operated for a considerable time, it is preferable to fill it with cold water rather than have it stand empty as it apparently deteriorates less when filled with water.

With the apparatus thus constructed, the process or method of employing the same for the refining of brimstone or for the recovery of sulphur from sulphur concentrates and the richer sulphur ores, is as follows:

As brimstone melts in hot water it is not necessary to first grind it but it should be broken small enough to readily pass through the opening 10 through which the mixer is charged. Concentrates and ores which do not melt readily in hot water should be pulverized. Having thus prepared the material to be treated and starting with the apparatus empty and the valves and openings closed, and the pump and agitators at rest, the valves 68 and 93 are opened and steam under pressure is allowed to flow through the plate 17 and heat it and from this plate it flows through the pipe 69 into and through the plate 80 and heats it and from the plate 80 through the pipe 82 to the steam-heated draw-off valve 88 and heats it. The valve 86 should be adjusted to allow the escape of the water of condensation.

The valves 47, 55 and 73 are open and the steam pressure is put beneath the valves 45, 53 and 71 respectively so as to prevent melted sulphur from leaking back through the valves during the operation. A slight leakage of steam through these valves into the mixer will do no harm.

The plug 13 is removed and through the hole 10 the mixer is charged with the material to be treated. Forty pounds of such material for each cubic foot contents of the mixer 1 and the overflow tank 2 is a practical amount with which to charge the mixer. The pet cock 40 should be open, the valve 47 closed and the valve 49 at once opened and the hot water allowed to fill up the pipe 43 below the valve 44. The valve 45 is then opened and hot water under pressure enters the mixer under the distributing plate 7. The washing of the water under the distributing plate washes away any small portions of the brimstone, ore or concentrate, which might interfere with the circulation of the water by the circulating pump as hereinafter explained.

During the latter part of the operation of filling the mixer the rate at which the water is allowed to flow in should be lessened, otherwise at times melted sulphur is liable to froth into the pump 3 and the overflow tank 2. When water runs out of the pet cock 40 the valve 45 should be closed and the pet cock closed. The circulating pump should then be started, the valve 49 closed and the valve 44 at once opened. The valve 45 is then opened and the pump circulates the water taking it from the outlet pipe 15, forcing it through the pipe 43 and the valve 45 into the lower part of the mixer. The temperature should then be observed by the thermometer 66 or if preferred the pressure can be taken by the pressure gauge 35. Before the agitators are started the temperature should be well above the melting point of sulphur and should be about 260 degrees Fahrenheit or the pressure about 20 pounds to the square inch. If the temperature and pressure are lower than this the valve 53 should be opened and the steam blown into the bottom of the mixer through the opening 20. When the temperature of 260 degrees Fahrenheit or a pressure of 20 pounds to the square inch has been obtained and the water circulated long enough to be certain that the mass is of an even temperature, the valve 53 is closed. The valves 45 and 44 are closed and the valve 47 at once opened so that in case the operation of the pump is interfered with in starting the agitators, melted sulphur will not run back through the valve 45. The agitators are then started and when the agitators and pump are both running smoothly the valve 47 is closed, the valve 44 at once opened and the valve 45 opened. The valve 53 may then be closed entirely or left slightly open to keep up the temperature. If it is closed entirely it may be necessary from time to time to open it to bring the temperature back to about 260 degrees. The agitators thoroughly mix together the melted sulphur and the column of water pumped through it by the circulating pump.

The sulphur, by means of the process so far described, is cleaned in the following manner.

First, the steam passing up through the melted sulphur causes the sulphur to froth into the hot water above the sulphur thus dividing the melted sulphur into thin sheets which come into contact with the hot water and are washed. This washing is also assisted by the agitation.

Second, the forcing of the column of hot water through the melted sulphur washes out of it matter soluble in hot water and matter which may be held in suspension in hot water.

Third, the agitation of the melted sulphur and hot water pumped through it brings the melted sulphur and hot water into very intimate contact, washing foreign matter from the melted sulphur.

Of course the frothing of the melted sulphur in hot water could be caused by hot air or some other hot gas.

Although it is preferable to pump the hot water in the bottom of the melted sulphur and agitate the hot water and melted sulphur together as the water rises, it would be possible to obtain the same result by pumping the melted sulphur on to the top of the hot water and mixing the two together by agitation as the sulphur sinks. Figure 8 illustrates a mixer constructed for this purpose.

During the process any excess of steam may be withdrawn by the valve 37 and any excess of water may be withdrawn by the valve 39.

One object of this process is to remove the acid from the material treated. In case the washing does not sufficiently remove it, water may be withdrawn from the pet cock 41 or water escaping through the pipe 38 may be taken and its condition examined and if necessary to further remove the acid, it may be neutralized, preferably by some substance which with the acid gives a product that is soluble in water. Such a substance would be bicarbonate of sodium. To put the bicarbonate of sodium into the mixer the plug 60 is removed and the bicarbonate of sodium is placed in the tank 4 and the plug 60 put back in its place. The valve 65 is opened and hot water allowed to pass into the tank 4. The valve 53 is closed, if not already closed, the valve 55 is closed, the valve 59 at once opened and the valve 53 then opened and the hot water washes the bicarbonate of sodium into the mixer. The valve 55 is then opened, the valve 59 closed, and the valve 53 is closed or left slightly open to keep up the temperature in the mixer if so desired.

After this washing has continued for some time, from fifteen to twenty minutes being generally long enough, the valve 45 is closed, the valve 44 closed, and the valve 47 opened, putting the steam pressure under the valve 45. The circulating pump is then stopped. The valve 53 if open should be closed.

The next operation is to draw off the melted sulphur. It is preferable to leave the agitators running during this operation because otherwise the melted sulphur next to the outer walls of the mixer shows a tendency to harden. If the side walls of the mixer are steam-jacketed it is not necessary to run the agitators while the sulphur is being withdrawn. The valve 73 is adjusted so as to be nearly but not quite closed. The valve 71 is opened and the melted sulphur runs down the pipe 70 into the straining chamber. The small amount of steam coming through the valve 73 forms a layer of hot steam over the sulphur in the straining chamber and from the straining chamber passing through the hole 77, the steam rises through the pipe 70 and valve 71 into the mixer and keeps the pipe 70 and the sulphur and the valve 71 and the mixer hot and prevents the sulphur from hardening in the pipe, or mixer. The top surface of the sulphur in the strainer chamber 5 should be about even with the bottom of the hole 77.

The valve 98 is opened and steam is allowed to flow into the steam jacket of the vessel 96, the water of condensation being drawn off by the valve 100. The vessel 96 should be brought to such a temperature that the melted sulphur on striking the walls of the vessel 96 will not harden. Probably a temperature of 250 degrees is a practical temperature for this purpose but the exact temperature must be determined by experiment with the apparatus in use. The temperature must not be so low that the sulphur will freeze on the walls and it must not be so high that the contents of the receptacle 96 will be overheated, and on cooling form sulphur not soluble in carbon disulphide.

The draw-off valve is next opened. The sulphur passes through the straining medium 83 and into the grooves between the curved ridges of the strainer plate 81 and through the openings in the curved grooves to the holes 85 and through them and the central discharge passage of the strainer plate to and through the draw-off valve. The first of the sulphur that passes through is liable to be of inferior grade and should be drawn into a separate vessel and thrown back into the brimstone or concentrates or ore, whichever is used. After doing this the sulphur is drawn off until water begins to come through with the sulphur. The balance of the sulphur should be caught in a separate vessel and thrown back into the brimstone or concentrates or ore or whatever is being treated.

By the above process, the acid and the ash are reduced to less than one-half of one-hundredth of a per cent. The product, however, contains moisture, often as much as one-quarter per cent. For some purposes this amount is excessive. If the melted sulphur as it leaves the machine is caught in a cold vessel the first sulphur that touches the walls of the vessel will be chilled and will harden. Some amorphous sulphur is liable to be formed in this way and although the percentage is small, generally only a portion of one per cent, amorphous sulphur is objectionable as it is not soluble in carbon disulphide. This hardening of the sulphur by contact with the cold walls of a vessel in which it is drawn also imprisons in the hardened sulphur more or less moisture which would evaporate if the sulphur were liquid. To avoid both of these things, it is preferable to draw the melted sulphur into a vessel which has been heated to about 250 degrees Fahrenheit or a little hotter.

With all the precautions that may be taken, the sulphur may still retain an excess of moisture. If a vessel containing this sulphur as it comes from the machine, is placed on a stove and heated, the moisture boils out and is easily driven off or reduced to a very small amount but the heating of the sulphur in this way is liable to again form amorphous sulphur, which is not soluble in carbon disulphide.

There are various methods which can be used to dry the sulphur. First, it is kept in the receptacle 96 at a temperature slightly above the melting point of sulphur until the moisture evaporates. Keeping it in a vacuum or partial vacuum assists in evaporation. After this drying it is allowed to harden slowly. Secondly, the melted sulphur as it runs away from the machine is allowed to harden. It is then ground and kept at a temperature slightly below the melting point of sulphur and preferably treated with a column of hot air slightly below the melting point of sulphur. Thirdly, the sulphur is then drawn off into the steam heated receptacle 96 and allowed to remain there until the greater part of the water evaporates from it. I then grind it and pass through the ground sulphur a column of hot air at a temperature slightly below the melting point of sulphur. (Sulphur has been dried by the above methods until it contained only .035% of moisture.) After the sulphur is drawn off, the draw-off valve 88 and the valve 73 are closed, the valve 75 is opened and the water allowed to run out of the apparatus to the level of the pipe 74 and the valve 75 is closed. The practice then is to open the valves 45 and 53 and drive the steam through the openings 19 and 20 to blow out any sulphur that may have accumulated in them, the valves 45 and 53 are then closed and after removing the receptable 96 the draw-off valve is again opened until the water remaining in the strainer chamber and possibly some sulphur, are drawn off. The draw-off valve 88 and the valve 71 are then closed and the valve 73 opened and the apparatus is then ready for another operation.

It is not necessary at each operation to change the straining medium 83. When it becomes necessary to change it all valves are closed except the valve 75 which is open, the unions 92 and 91 in the pipes 69 and 89 are taken apart, the bolts 87 are removed and the lower plate 80, the strainer plate 81 and the draw-off valve 88 are removed and the straining medium 83 taken out and replaced with a new one or clean one and the apparatus is then again put together as shown in the description and drawings.

Fig. 8 is a form of mixer adapted for use when the melted sulphur instead of the water is circulated. The form of circulating pump shown operates best when the liquid to be pumped flows into it by gravity and for this reason the circulating pump is lowered so that it will be filled by the melted sulphur flowing into it from the mixer. Owing to its relatively high melting point 239 degrees Fahrenheit and its low latent heat in melting or freezing, sulphur freezes so readily that it is highly advisable to make the pipes and connections through which the sulphur flows as short as convenient and to steam jacket them and the circulating pump.

In the form of mixer shown in Fig. 8 the lower plate 119 is the same as the lower plate 17 in Fig. 2, except that the opening 20 is omitted. Into the wall of the cylinder 8 and as near to its bottom as convenient is screwed or otherwise attached a pipe 101 which extends to the intake of the circulating pump 102 and from the outlet of the circulating pump a pipe 103 extends to and empties into the pipe 15. The pipes 101 and 103 and the pump 102 are surrounded by a steam jacket 104. A section of the pipes 101 or 103 and the steam jacket 104 is shown in Fig. 9. Steam under pressure is admitted to the steam jacket by the pipe 105 controlled by the valve 106 and the water of condensation is drawn off by the pipe 107 controlled by the valve 108. The steam should be at a pressure sufficient to keep the circulating pump 102 and the pipes 101 and 103 at a temperature of 248 degrees Fahrenheit or above.

From the opening 19 in the plate 119 extends the pipe 109 controlled by the valve 110. The valve 110 should be set as near the plate 119 as convenient. The pipe 109 has four branches: (1) the pipe 111 controlled by the valve 112 and connected with a source of steam under pressure; (2) the pipe 113 controlled by the valve 114 and connected with a source of hot water under pressure; (3) the pipe 115 controlled by the valve 116 and connected with a source of cold water under pressure; (4) the pipe 117 controlled by the valve 118 and connected with the outlet of the tank 4.

In operating the mixer as shown in Figure 8 after charging the mixer with material to be treated and after the valves 68 and 93 have been opened, the valve 86 adjusted as heretofore explained, the valve 106 is opened to admit steam to the steam jacket 104 and the valve 108 is adjusted to allow the escape of the water of condensation. The valve 112 is opened to place the steam pressure under the valve 110 and the material to be treated is placed in the mixer and the plug 13 put in place as heretofore explained. The valve 114 is opened, the valve 112 closed and the valve 110 opened and hot water rushes into the mixer, its inward flow being lessened as the mixer fills and continuing until the water appears in the water glass 33. The valve 110 is closed, the valve 112 opened and the valve 114 at once closed. During the filling of the mixer the valve 37 should be slightly open to allow the escape of the air compressed by the filling of the mixer, and it should then be closed. If the temperature is less than 260 degrees or the pressure is less than 20 pounds the valve 110 is opened and steam blown into the mixer. When such temperature or pressure is reached the valve 110 is closed or left slightly opened as preferred to keep up the temperature. Any excess of pressure is allowed to escape at the valve 37 and any excess of water is allowed to escape at the valve 39. The circulating pump and agitators are then started. The circulating pump pumps the melted sulphur from the lower part of the mixer into the pipe 15 from which it runs by its own weight into the top of the mixer and as it sinks in the hot water it is thoroughly agitated with the hot water and is washed. After it has been washed the necessary length of time it is withdrawn from the mixer, strained and caught in the heated vessel 96 as hereinbefore explained.

Fig. 10 is a form of mixer in which the frothing quality of melted sulphur is relied on to circulate it and mix it with the hot water. This form has neither an agitator nor a pump. In this form the upper plate 120 has two openings one adapted to receive the plug 13 and the other adapted to receive the pipe 31 leading to the overflow tank 2. The lower plate 17 is the same as plate 17 shown in Fig. 2. Through central opening 19 of the plate 17 extends a nipple 121 terminating at its upper end slightly above the plate 17. At its lower end and as near to the plate 17 as convenient is placed a valve 122. From this valve extends a pipe 123 having two branches (1) the pipe 124 controlled by the valve 125 and connected with a source of steam under pressure; (2) the pipe 126 controlled by the valve 127 and connected with a source of hot air under pressure. From the hole 20 in the plate 17 extends a pipe 128 controlled by a valve 129 which valve is placed as near the plate 17 as convenient. The pipe 128 has three branches (1) the pipe 129 controlled by the valve 130 and connected with a source of hot water under pressure; (2) the pipe 131 controlled by the valve 132 and connected with a source of cold water under pressure; (3) the pipe 133 controlled by the valve 134 and connected with the outlet of the tank 4. In the mixer and concentric with it and the nipple 121 is a tube 135, the lower portion of which is shown in section. It extends from a little above the plate 17 to a point above the surface of the melted sulphur in the mixer. The tube is slightly enlarged and funnel shaped at its lower end. Its diameter may be relatively large and when an abundance of steam or compressed air is available the inside diameter of the tube 135 may be as much as or even more than one-sixth of the diameter of the mixer. The tube 135 is held in place by bars 136 extending across the inside of the mixer with the ends of such bars secured to the walls of the mixer as by rivets.

In operating the mixer as shown in Fig. 10, after charging the mixer with material to be treated and opening the valves 68 and 93 and adjusting the valve 86 as hereinbefore explained, the valve 125 is opened to put the steam pressure under the valve 122. The valve 130 is opened and left open to put the water pressure under the valve 129. The valve 129 is then opened and the hot water rushes into the mixer. The flow of the water should be lessened as the mixer fills and when the water appears in the water glass 33 the valve 129 should be closed. The valve 122 is then opened and the steam blown into the lower end of the tube 135. When the sulphur melts the steam mixing with it causes it to froth and overflow into the hot water at the upper end of the tube 135. In passing through the water the melted sulphur in sheets and small particles or drops comes in contact with the hot water and is washed. Any excess of steam is allowed to escape at the valve 37, and any excess of water is allowed to escape at the valve 39. After the sulphur is sufficiently washed it is withdrawn from the mixer, strained and caught in the heated vessel 96 as hereinbefore explained. Hot compressed air or other gas, through the valve 127 may be used instead of steam through the valve 125 to cause the frothing of the sulphur.

From the foregoing, it will be seen that the sulphur is washed by bringing its particles into contact with hot water. In this the frothing greatly assists. In the apparatus shown in Fig. 1 the steam is admitted by the valves 45 and 52 for the purpose of heating the apparatus. This steam, as soon as the sulphur is melted, causes the sulphur to froth into the hot water and washes it. In the apparatus shown in Fig. 8 the steam is admitted by the valve 110 to heat the apparatus. This steam, as soon as the sulphur is melted, causes the sulphur to froth into the hot water and washes it. In the apparatus shown in Fig. 9 steam is admitted by the valve 122 to heat the apparatus and as soon as the sulphur is melted this steam causes the sulphur to froth into the hot water and washes it. Where liquid sulphur and either hot water, steam or hot air are mixed together and are in sufficiently rapid motion, the sulphur will froth. For instance, in operating and filling the apparatus shown in Fig. 1 care must be exercised or the liquid sulphur will froth into the overflow tank 2 and close the valve 39. This has sometimes happened in operating this apparatus. In the operation of each apparatus shown the sulphur froths into the hot water and is thereby washed. In each apparatus mentioned the receptacle containing the hot water and liquid sulphur is stationary and under pressure during operation and in Figs. 1 and 8 either the water or sulphur is maintained in constant circulation by the circulator 3 or the circulator 102 so that either hot water flows through the liquid sulphur or the liquid sulphur flows through the hot water and in Fig. 10 the frothing sulphur passes through the hot water and also when the froth breaks drops of sulphur are formed and pass through the hot water. Furthermore, in the apparatus shown in Fig. 10 it is best to use a circulator or pump of any kind (not shown) connected between the outlet 31 and the inlet nozzle 121, whereby the steam or hot air or other fluid will be given a predetermined circulation into and out of the receptacle, continually frothing the sulphur into the hot water within the receptacle. In any event each apparatus operates by passing hot water through the sulphur or sulphur through the hot water, and the use of steam or hot air through the nozzle 121 into the pipe 135 is the means of circulating the liquid sulphur in the apparatus shown in Fig. 10.

The stops 29 and the agitators 28 are not necessary to the washing of the sulphur but assist in it and hasten it. For instance, in the operation of the apparatus shown in Fig. 1 it is sufficient to force the water by the circulating pump 3 through the pipe 43 into the bottom of the receptacle 8 without using the agitators or stops. The water then passes into the receptacle 8 under the distributing plate 7 moves the sulphur about and agitates it and the water comes into contact with varying layers of the liquid sulphur and washes it and also froths the liquid sulphur into the hot water, thus further bringing about the contact of the liquid sulphur and hot water which washes the sulphur.

In the claims herewith presented the agitation referred to is not only agitation caused by the stops 29 and the agitators 28 but includes agitation caused by passing the hot water through the melted sulphur or the melted sulphur through the hot water, and all other forms of agitation.

The method and apparatus can be employed in connection with extracted sulphur and in connection with sulphur-bearing ore or other sulphur-bearing materials of proper character.

What I claim as my invention is—

1. The process of refining sulphur, comprising the placing of melted sulphur and hot water in a closed vessel and repeatedly passing the same hot water by predetermined circulation thereof through the melted sulphur and thereby washing the melted sulphur.

2. The process of refining sulphur, comprising the placing of melted sulphur and hot water in a closed vessel and repeatedly passing the same hot water by predetermined circulation thereof through the melted sulphur and agitating them together and thereby washing the melted sulphur.

3. The process of refining sulphur, comprising the placing of melted sulphur and hot water in a closed vessel and repeatedly passing one by predetermined circulation thereof through the other and thereby washing the melted sulphur.

4. The process of refining sulphur, comprising the placing of melted sulphur and hot water in a closed vessel and repeatedly passing one by predetermined circulation thereof through the other and agitating them together and thereby washing the melted sulphur.

5. The process of extracting sulphur from sulphur ore or sulphur concentrates, comprising the melting of the sulphur therefrom with hot water in a closed vessel and repeatedly passing the hot water by predetermined circulation thereof through the melted sulphur and thereby washing the melted sulphur.

6. The process of extracting sulphur from sulphur ore or sulphur concentrates, comprising the melting of the sulphur therefrom with hot water in a closed vessel and repeatedly passing the hot water by predetermined circulation thereof through the melted sulphur and agitating them together and thereby washing the melted sulphur.

7. The process of extracting sulphur from sulphur ore or sulphur concentrates, comprising the melting of the sulphur therefrom with hot water and passing one by predetermined circulation thereof through the other and thereby washing the melted sulphur.

8. The process of extracting sulphur from sulphur ore or sulphur concentrates, comprising the melting of the sulphur therefrom with hot water and passing one by predetermined circulation thereof through the other and agitating them together and thereby washing the melted sulphur.

9. The process of extracting sulphur from sulphur ore or sulphur concentrates, comprising the melting of the sulphur therefrom with hot water in a closed vessel and repeatedly passing the one by predetermined circulation thereof through the other and thereby washing the melted sulphur.

10. The process of extracting sulphur from sulphur ore or sulphur concentrates, comprising the melting of the sulphur therefrom with hot water in a closed vessel and repeatedly passing one by predetermined circulation thereof through the other and agitating them together and thereby washing the melted sulphur.

11. The process of extracting sulphur from sulphur ore or sulphur concentrates, comprising the melting of the sulphur therefrom within a closed vessel and forcing a heated aqueous fluid through the melted sulphur and thereby washing the melted sulphur.

12. The process of extracting sulphur from sulphur ore or sulphur concentrates, comprising the melting of the sulphur therefrom with hot water in a closed vessel and forcing a heated aqueous fluid through the melted sulphur and agitating the melted sulphur and hot water together and thereby washing the melted sulphur.

13. The method of treating sulphur by the use of heat and water, while the sulphur or the sulphur bearing materials and water are confined under pressure, comprising the predetermined and continuous circulation of one through the other, to froth the melted liquid sulphur into the water, thereby washing the liquid sulphur, and thereafter recovering the washed melted sulphur.

Signed.

WILLIAM P. THORNTON.